UNITED STATES PATENT OFFICE 2,514,897

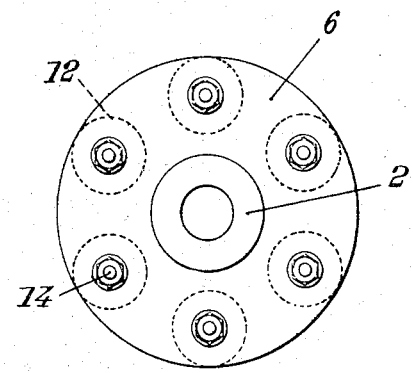
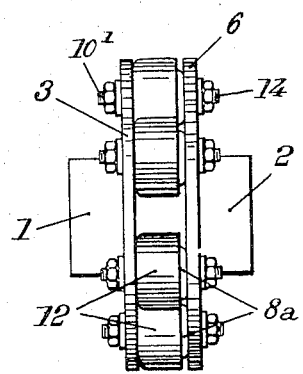
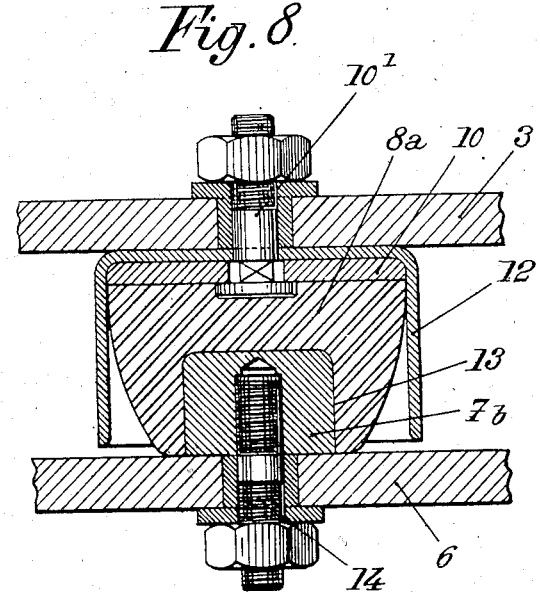

ELASTIC COUPLING

Jean-Félix Paulsen, Paris, France

Application March 19, 1945, Serial No. 583,447
In Belgium August 5, 1943

Section 1, Public Law 690, August 8, 1946
Patent expires August 5, 1963

10 Claims. (Cl. 64—14)

The present invention relates to elastic couplings and it is more especially, although not exclusively concerned, among these devices, with couplings for the transmission of high efforts or of efforts that undergo very considerable variations, such for instance as the couplings used for the drive of rolling-mill trains, in which overloads or peaks occur frequently.

The object of the present invention is to provide a coupling device such that its efficiency, as elastic coupling, remains substantially the same for all values of the torque that is transmitted therethrough, and, accordingly, a coupling device which is very elastic when the efforts to be transmitted are within a normal range of variation but which gradually becomes more and more rigid as the torque that is transmitted and the resulting elastic deformation become greater and greater. It should be noted that this is contrary to what takes place in the case of known coupling devices of the same general type, in which the elastic deformation undergone is substantially proportional to the value of the torque that is transmitted, which makes it necessary to provide a very rigid elastic coupling (which deforms very little and is therefore of low efficiency when the transmission is not working at high power).

According to an essential feature of the present invention, the elastic coupling includes at least one block of an elastic material adapted to cooperate with at least one rigid part belonging to the driving or the driven element of the coupling by application of the base of this block, without possibility of sliding displacement, against a surface of said part parallel to the direction of the efforts to be transmitted and by gradual engagement, as this block is getting more and more deformed, of one side thereof with another surface of said part lying transverse to the direction of this effort, said block being provided with a hole or housing generally parallel to the last mentioned surface and coplanar with the axis of the driving and driven elements, and in which is engaged a projection carried by the other element of the coupling, to wit the driven or driving element thereof, respectively, whereby the effort is first transmitted by the block in shearing, which provides relatively great flexibility, after which, when the torque has increased, this block is in compression between said projection and the second mentioned surface, which provides increased rigidity.

According to a preferred embodiment of my invention, each block of elastic material, for instance of rubber, is given a shape analogous to that of a frustum of a pyramid or a cone; the first mentioned element of the coupling is adapted to form, or to carry a piece forming, a housing cavity for said block such that the larger base of the block can be applied against a face of said housing parallel, or substantially so, to the direction of the effort to be transmitted and which constitutes the first surface above mentioned, while the lateral surface of the block is intended to cooperate with the wall or walls of said housing transverse (for instance perpendicular) to the direction of the effort to be transmitted, said lateral surface being therefore normally out of contact with said last mentioned wall, or walls, of the housing (said wall, or walls, constituting the second surface above mentioned) and being gradually forced into contact therewith over an increasingly greater area as the torque to be transmitted is increasing. In this embodiment, the projection carried by the second mentioned element of the coupling engages in an axial hole opening into the smaller base of the block.

Prefered embodiments of the present invention will be hereinafter described, with reference to the accompanying drawings, in which:

Figs. 6 and 7 are an elevational view and a side view, respectively, of a coupling device made according to a fifth embodiment of the invention;

Fig. 8 is a view showing, on a larger scale and in axial section, one of the elastic blocks of the coupling device of Figs. 6 and 7.

Figure 1:
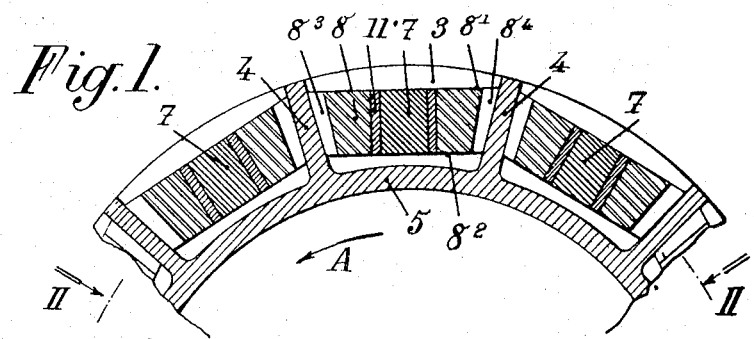
Fig. 1 is a transverse sectional view, on the line I—I of Fig. 2, and Fig. 2 a developed section, along circular line II—II of Fig. 1, of a portion of an elastic coupling made according to a first embodiment of my invention.

In the example illustrated by the drawings, it will be supposed that the effort is exerted by a driving shaft 1 and that it is transmitted, either in one direction of rotation or in the other, and for instance in the direction of arrow A, through the intermediate of the elastic coupling interposed between this shaft 1 and a driven shaft 2. But of course, the parts played by these shafts can be reversed, and also the effort might be supplied and received by pieces other than shafts.

On shaft 1 there is provided a disc 3 or a circular annular element $3^1$ which includes, on the side thereof opposed to the side on which shaft 1 is located, projections, ribs, or, in a general way, walls 4 or $4^1$, transverse, and in particular perpendicular, to this face or side. These walls 4 or $4^1$ are regularly distributed around the axis of shaft 1 and I thus obtain housings or recesses the bottom of which is constituted by said face of disc 3 or annular element $3^1$ and the lateral walls of which are constituted by the corresponding sides of walls 4 or $4^1$. As shown by the drawing, these wall sides are generally of plane shape and perpendicular to the above mentioned face of disc 3 or annular element $3^1$, but they might as well be oblique or curvilinear.

Figure 4:
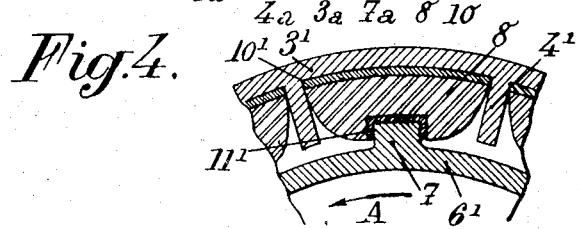
Fig. 4 is a transverse section of a coupling made according to a third embodiment.
Figure 5:
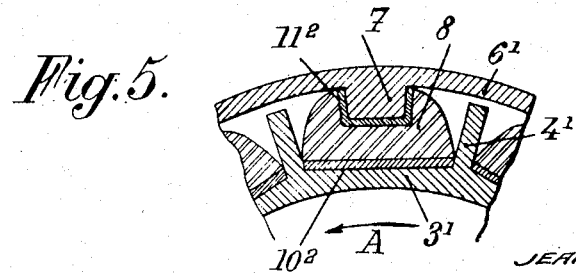
Fig. 5 is a view, similar to Fig. 4, of a modification.

In the embodiment (Figs. 1 and 2) in which the first mentioned element of the coupling is a disc, such as 3, perpendicular to the axis of shaft 1, walls 4 are therefore parallel to said axis and they may be interconnected not only by said disc but by a flange 5 integral with said disc. On the contrary, when said element of the coupling device is constituted by a circular annular element such as $3^1$ coaxial with shaft 1, walls $4^1$ are radial and may extend either inwardly, as shown by Fig. 4, or outwardly, as shown by Fig. 5.

Figure 2:
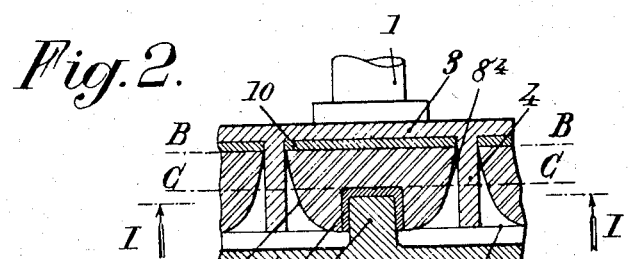

According to the embodiment illustrated by Figs. 1 and 2, the driven shaft 2 is provided with a disc 6 parallel to disc 3 and located at a distance therefrom greater than the height of walls 4. On the face of disc 6 opposed to the side on which shaft 2 is located, that is to say on the side of said disc that is turned toward the disc 3 that carries walls 4, disc 6 is provided with projections (either integral therewith or fixed thereto), of prismatic, cylindrical, or other shape and so positioned that the axis of each of these projections coincides with the axis of one of the recesses or chambers (referred to in some of the claims as cavities) formed on disc 3 by walls 4, the number of these projections 7 being therefore equal to the number of these chambers. The height of these projections 7 corresponds, in the example shown by the drawing, to about one half of the depth of these recesses or chambers.

In each of these recesses or chambers is fitted a block 8 of an elastic material, such for instance as rubber, either reinforced or not, which is given the shape of a frustum of a pyramid and has a base portion and a summit portion. The opposed faces $8^1$ and $8^2$ of this block may, as shown by the drawing, be parallel to each other, and perpendicular to the bases of the pyramid. As for the lateral faces $8^3$ and $8^4$, either plane or curvilinear, they converge toward each other from the base to the summit of the block and, further, are differently inclined with respect to the median longitudinal plane of the block so that the lateral edges of the larger base thereof can be placed in contact with the adjacent lateral faces of walls 4. It follows that, when the block is fitted in its normal position inside its chamber or recess, its larger base is applied against the vertical end wall, or bottom, thereof (referred to in the claims as a face and in some of the claims as a wall), while the side faces of this block, respectively $8^3$ and $8^4$ diverge from the walls 4 of the chamber of recess, from the edges of said side faces common with the larger base $8^1$, which edges are applied against said walls 4, toward the edges of said side faces which are common with the smaller base $8^2$ and where the distance between said side faces $8^3$ and $8^4$ and walls 4 is at its maximum.

In the central part of each block I provide a hole or housing 9 having its axis co-planar (lying in a common plane) with the common axis of parts 3 and 6, and adapted to cooperate with the corresponding projection of disc 6. The latter fits in this housing at least along the lateral faces thereof that are at right angles to the direction of the effort to be transmitted.

Advantageously, according to a feature of the invention, I fix on the larger base $8^1$ of block 8 a metallic reinforcement plate 10 which adheres to the rubber mass and which is secured to disc 3 by welding, screwing, riveting, or by mere engagement between walls 4. In a likewise manner, concerning housing 9, I provide the walls thereof with a metallic lining, of U-shaped cross section, which is thus interposed between block 8 and the corresponding projection 7. This particular construction has the advantage that the blocks better resist the efforts they have to undergo.

In the embodiment which has been just described, the rubber blocks can be engaged radially in their respective recesses or chambers, when the coupling is assembled or when parts thereof are to be replaced, without any necessity of moving shafts 1 and 2 away from each other or of removing discs 3 and 6 from their normal positions. This advantage is due to the fact that the recesses or chambers in question are open on the side of the periphery of the coupling and that it suffices to push the blocks into these chambers or recesses until reinforcements 10 and 11 have come into contact with the parts (walls 4 and projections 7), with which they are to coact.

Figure 3:
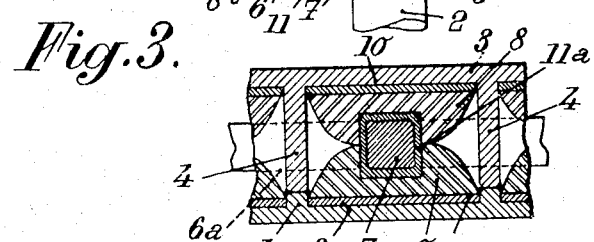
Fig. 3 is a view, analogous to Fig. 2, of a modification.

In the modification shown by Fig. 3, I add to plate 3 a second plate $3a$ parallel to the first and also fixed to shaft 1. This second disc $3a$ is provided with ribs or walls $4a$ located respectively opposite the free ends of walls 4 and which may be fixed thereto, for instance by welding. The driving element of the coupling is thus constituted, in this modification, by a kind of cage including a plurality of radial recesses. In each of these recesses, I fit two rubber blocks 8, analogous to those above described and the smaller bases of which are opposite each other and, advantageously, as shown by the drawing, in contact with each other. In this modification, the driven element $6a$ of the coupling is constituted by a circular annular element provided with radial projections $7a$, each provided with a metal lining $11a$.

In the embodiments illustrated by Figs. 4 and 5, the driving element $3^1$ and the driven element $6^1$ are disposed coaxially one inside the other and the blocks $8^1$ are interposed between these elements. The bases of these blocks and their reinforcements $10^1$ and $11^1$ may be made of rounded shape, with a curvature corresponding to the diameters of elements $6^1$ and $3^1$, as shown by Fig. 4. But, according to a modification, as illustrated by Fig. 5, the outer face of element 3 is made of polygonal section, elements $10^2$ and $11^2$ having plane surfaces, which simplifies the manufacture thereof.

When the elastic coupling according to the invention, made as above set forth, is utilized for the transmission of a variable effort, the rubber blocks are in shearing between surfaces B—B and C—C (Fig. 2) as long as the torques transmitted by the coupling have normal or reduced values. When the torque that is being transmitted exceeds a given value, the blocks are deformed and a slight relative angular displacement takes place between the elements of the coupling such as 3 and 6. As a consequence of this, a larger and larger portion of the side face 8³ of blocks 8 (for the direction of rotation corresponding to arrow A) is applied against the adjacent wall 4 so that a greater and greater portion of the rubber mass is compressed between this wall and the corresponding projection 7, with its reinforcement 11. The elastic coupling therefore becomes more and more rigid, the more so as rubber, as it is well known, is much more rigid in compression than in shearing. When the invention is applied to the case of a power transmission, in which "peaks" are liable to occur, the coupling is so calculated that, as long as the power that is transmitted is of normal value, or lower than this normal value, the mass of rubber is only in shearing, and it is only when there is a peak, that contact is established, along a gradually increasing area, between blocks 8 and walls 4, thus causing a gradually increasing portion of said rubber mass to be in compression. When normal working conditions are resumed, the rubber blocks automatically come back to their initial shape.

In the embodiment of Figs. 6 to 8, each of the rubber blocks, designated by reference numeral 8a, is given the shape of a body of revolution having the general shape of a frustum of a cone. In other words, the cross sections of the rubber blocks parallel to disc 3 are of circular shape.

The larger base of each block 8a is provided with a flat metallic reinforcement 10 which adheres to the rubber mass and which is secured to disc 3 through bolts 10¹, or by riveting, welding and so on.

In order to provide the surface transverse to the direction of the effort to be transmitted, in this case each block is surrounded by a bell-shaped piece 12, of circular section and the lateral wall of which is cylindrical, the bottom surface of this bell-shaped piece 12 corresponding substantially to the area of reinforcement 10 and consequently of the larger base of block 8a.

Due to the shape of block 8a, the lateral wall of said block and the corresponding portion of the cylindrical wall of piece 12 diverge from each other from the base of larger area toward the smaller base, which ensures, in operation, the same way of working as above described, concerning the deformation and elastic resistance of the rubber block.

In the smaller base of block 8a I provide at least one hole, for instance a central hole 13 adapted to act as housing for a rigid projection 7b fixed, for instance by means of a bolt or screw 14, to a disc 6 carried by the driven shaft. The inner wall of said hole 13 may be fitted with a metal or other lining, as above set forth.

In the embodiment shown by Figs. 6 to 8 of the drawing, the rubber blocks are distributed at regular intervals along a circumference concentric with shafts 1 and 2. I may of course make use of two series of blocks distributed along concentric circumferences, for instance in staggered relationship.

This embodiment of my invention works in the same manner as above described with reference to the other embodiments (rubber mass normally in shearing), and, in the case of a peak, compression of a gradually increasing portion of said rubber mass. But, in addition to these advantages, in this particular case, the radial elasticity of elastic blocks 8a enables the coupling device to adapt itself to slight defects of alignment between shafts 1 and 2, which facilitates the assembly and eliminates the transmission of vibrations from one shaft to the other. Furthermore, it should be noted that bell-shaped piece 12 opposes any exaggerate deformation of the rubber or other material of block 8a in the outward direction under the effect of centrifugal forces acting thereon, so that this particular type of coupling device is well adapted to high speeds of revolution of the shafts.

An elastic coupling made according to my invention as above described, whatever be the particular embodiment that is chosen, is well adapted to meet the requirements above set forth. The number and size of the recesses or chambers provided for the elastic blocks, and also the shape, constitutive material, and size of these blocks can easily be calculated to correspond to the power to be transmitted. It should be well understood that the movement of the driving and driven elements of the coupling is not necessarily a rotational movement, but might be a translatory or other movement.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An elastic coupling which comprises, in combination, a first rigid rotary part, a second rigid rotary part coaxial with said first part, one of said parts being the driven part of the coupling and the other part being the driving part thereof, said driving part being rotatable coaxially with respect to said driven part for transmission of the drive thereto, a plurality of rigid walls carried by the first part along the periphery thereof, each of said walls having at least a portion of its lateral surfaces extending in a generally radial direction with respect to the axis of said rotary parts, said first part having a face located between the bases of each two successive ones of said walls, a plurality of elastic blocks, each of said blocks having a base portion and a summit portion joined by lateral walls, the base portion of each block being mounted on one of said faces and extending substantially the entire distance between the two walls defining the face, each lateral wall being located adjacent a surface of one of said rigid walls, each lateral wall and its adjacent rigid wall surface diverging from each other starting at a point located in proximity to the face on which the block is mounted, each block having a hole extending thereinto from the summit portion and extending only part of the distance to the base of the block, the axis of said hole being co-planar with the axis of said rotary parts, and a plurality of rigid means carried by the second part and engaged each in one of said holes, whereby torque force being transmitted from said driving part to said driven part is first transmitted resiliently through said blocks in shear, and as the force increases is transmitted in compression of said blocks with increasing rigidity as the blocks are deformed to bring the lateral walls of said blocks into contact with the adjacent surfaces of said rigid walls to an increasing degree.

2. An elastic coupling as set forth in claim 1, and a rigid plate secured to the base of each block and to the corresponding face of said first rotary part.

3. An elastic coupling according to claim 1, in which said blocks taper from their base portions to their summit portions.

4. An elastic coupling as set forth in claim 1, in which said faces lie perpendicular to the axis of said rotary parts.

5. An elastic coupling as set forth in claim 1, in which said faces lie perpendicular to the axis of said rotary parts, and the axes of the holes in said blocks lie parallel to and equidistant from the axis of said rotary parts.

6. An elastic coupling as set forth in claim 1, in which said faces lie perpendicular to the axis of said rotary parts, said rigid means comprising projections extending radially with respect to the axis of said rotary parts.

7. An elastic coupling as set forth in claim 1, in which said faces lie on a common cylindrical surface coaxial with said rotary parts.

8. An elastic coupling which comprises, in combination, a first rigid rotary part, a second rigid rotary part coaxial with said first part, one of said parts being the driven part of the coupling and the other part being the driving part thereof, said driving part being rotatable coaxially with respect to said driven part for transmission of the drive thereto, means carried by said first rotary part and forming at least one cavity bounded by lateral and bottom walls, at least one elastic block, each block having a base portion and a summit portion joined by lateral walls, the base portion of each block being mounted on the bottom wall of one of said cavities and extending substantially the entire width of said bottom wall, each lateral block wall being located adjacent a lateral wall of the cavity in which the block is mounted, each lateral block wall and its adjacent cavity wall diverging from each other starting at a point located in proximity to the bottom wall of the cavity in which the block is mounted, each block having a hole extending into the summit portion thereof and extending only part of the distance to the base of the block, the axis of said hole being coplanar with the axis of said rotary parts, and a plurality of rigid means carried by the second rotary part and engaged each in one of said holes, whereby torque force being transmitted from said driving part to said driven part is first transmitted resiliently through said blocks in shear, and as the force increases is transmitted in compression of said blocks with increasing rigidity as the blocks are deformed to bring the lateral walls of said blocks into contact with the adjacent lateral cavity walls to an increasing degree.

9. An elastic coupling which comprises, in combination, a first rigid rotary part, a second rigid rotary part coaxial with said first part, one of said parts being the driven part of the coupling and the other part being the driving part thereof, said driving part being rotatable coaxially with respect to said driven part for transmission of the drive thereto, said first part having a surface perpendicular to the axis of the rotary parts, a plurality of cup-shaped elements attached to said surface with their axes parallel to the axis of said rotary parts, a plurality of elastic blocks, each of said blocks having a base portion and a summit portion joined by lateral walls, said blocks tapering from their base portions to their summit portions, the base portion of each block being attached to the bottom of one of said cup-shaped elements, the base portion of each block having a diameter substantially equal to the bottom diameter of said cup-shaped elements, each block having a hole extending into the summit portion thereof and extending only part of the distance to the base of the block, the axis of said hole being parallel with the axis of said rotary parts, and a plurality of studs carried by the second part and engaged each in one of said holes, whereby torque force being transmitted from said driving part to said driven part is first transmitted resiliently through said blocks in shear, and as the force increases is transmitted in compression of said blocks with increasing rigidity as the blocks are deformed to bring the lateral walls of said blocks into contact with the adjacent surfaces of said cup-shaped elements to an increasing degree.

10. An elastic coupling according to claim 9, in which said blocks are rounded, all of said cup-shaped elements being located equidistant from the axis of said rotary parts.

JEAN-FÉLIX PAULSEN.

REFERENCES CITED

The following references are of record in the file of this patent:

UNITED STATES PATENTS

| Number | Name | Date |
|---|---|---|
| 1,780,727 | Tenney | Nov. 4, 1930 |